United States Patent
Hall et al.

(10) Patent No.: US 9,582,418 B2
(45) Date of Patent: Feb. 28, 2017

(54) CONFIRMING THE SENSITIVITY OF A DATA OBJECT IN A MANAGED OBJECT HEAP

(75) Inventors: Andrew J Hall, Hampshire (GB); Neil R Hardman, Hants (GB); William Smith, Hampshire (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 221 days.

(21) Appl. No.: 12/906,803

(22) Filed: Oct. 18, 2010

(65) Prior Publication Data
US 2011/0153689 A1    Jun. 23, 2011

(30) Foreign Application Priority Data
Dec. 17, 2009 (EP) .................. 09179934

(51) Int. Cl.
*G06F 17/30* (2006.01)
*G06F 12/02* (2006.01)

(52) U.S. Cl.
CPC .... *G06F 12/0253* (2013.01); *G06F 17/30902* (2013.01)

(58) Field of Classification Search
CPC .............................................. G06F 17/30902
USPC ........................ 707/813; 726/17, 21; 711/170
See application file for complete search history.

(56) References Cited

U.S. PATENT DOCUMENTS

| | | | | |
|---|---|---|---|---|
| 5,572,673 A | * | 11/1996 | Shurts | G06F 21/6218 707/999.2 |
| 6,253,215 B1 | * | 6/2001 | Agesen | G06F 12/0253 707/206 |
| 7,089,242 B1 | * | 8/2006 | Chan | G06F 9/468 707/9 |
| 2005/0129235 A1 | * | 6/2005 | Little | G06F 12/0261 380/255 |
| 2010/0211754 A1 | * | 8/2010 | Crosby | G06F 9/5016 711/170 |

OTHER PUBLICATIONS

IBM, A system to collect middleware diagnostic data without compromising confidential customer data, IPCOM000184384D. Jun. 23, 2009.
Wikipedia. "Garbage Collection (computer science)." Retrieved from <http://en.wikipedia.org/wiki/Garbage_collection_(computer_science)>.
Wikipedia. "Public key infrastructure." Retrieved from <http://en.wikipedia.org/wiki/Public_key_infrastructure>.
Wikipedia. "Dominator (graph theory)." Retrieved from <http://en.wikipedia.org/wiki/Dominator_(graph_theory)>.
Wikipedia. "Java annotation." Retrieved from <http://en.wikipedia.org/wiki/Java_annotation>.

(Continued)

*Primary Examiner* — Apu Mofiz
*Assistant Examiner* — Chelcie Daye
(74) *Attorney, Agent, or Firm* — Prentiss Johnson; Edell, Shapiro & Finnan, LLC

(57) ABSTRACT

A method, system and computer program product for confirming the sensitivity of a data object in a managed object heap software runtime environment based on a determination that the object is accessible only via other objects known to be sensitive.

20 Claims, 4 Drawing Sheets

(56) References Cited

OTHER PUBLICATIONS

Mowbray, et al. "Dominator-tree analysis for distributed authorization." PLAS '08 Proceedings of the third ACM SIGPLAN workshop on Programming languages and analysis for security. 2008. Retrieved from <http://portal.acm.org/citation.cfm?id=1375709>.

* cited by examiner

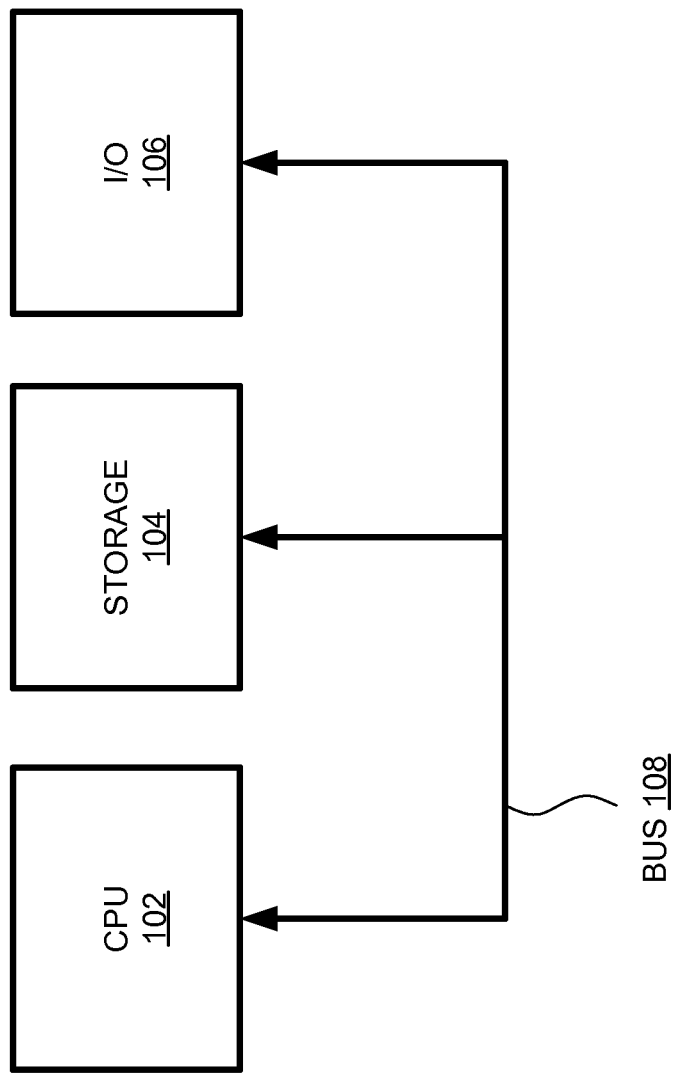

CONFIRMING THE SENSITIVITY OF A DATA OBJECT IN A MANAGED OBJECT HEAP

CROSS-REFERENCE TO RELATED APPLICATIONS

This application claims the benefit of European Patent Application No. 09179934.0 filed Dec. 17, 2009 and entitled "Confirming the Sensitivity of a Data Object in a Managed Object Heap", which is assigned to the assignee of the present application, and the teachings of which are hereby incorporated by reference in their entirety.

BACKGROUND

The disclosure relates to the field of confirming sensitive objects in managed software heap systems, and more particularly to derived sensitivity based on references by known sensitive objects in the heap.

Memory management in runtime environments is often devised so as to provide convenience for the software engineer. For this reason, runtime environments such as Java, C# and most scripting language runtimes include heap memory that can be said to be managed, such as by the inclusion of a garbage collector (Java is a trademark of Sun Microsystems, Inc.). A garbage collector is a runtime facility for automatically identifying and discarding unused data from memory, such as objects, so as to free up storage. Garbage collection is a luxury afforded by the efficiencies of modern computer systems that serves to liberate software engineers from the task of programmatically discarding each and every unused object.

A managed heap provided by a runtime environment is used by application programs for the storage and retrieval of data objects, such as instances of classes in object oriented environments or the storage of other data structures. The heap is therefore accessible to applications. Furthermore, problem determination and diagnosis for software applications and runtime environments will typically involve accessing the contents of a heap in order to understand the state of an application and the runtime environment at a particular point in time, or over a period of time. For example, diagnosis activities for the resolution of memory leaks, software operational problems and data organization issues can involve access to the heap. The heap can be accessed at runtime, during execution of an application, or via a record of the contents of the heap in a dump file.

Some data stored in the heap can be sensitive. For example, certain applications may involve secret or confidential information that should not be shared outside an organization. Such sensitive data in the heap is secure as long as the heap is present only on a secure, trusted machine. However, problem determination and diagnosis often requires access to the heap by machines and personnel not party to the sensitive data. To respect the sensitivity of such data access must be restricted. This can hinder problem determination and diagnosis activities. A particular example is where application software or the runtime environment is serviced by an organization not capable of being or willing to be entrusted with the sensitive information. In such a scenario, a dump file of data objects in a managed heap containing sensitive data cannot be shared with a servicing organization for the purpose of problem determination. It is therefore necessary to identify sensitive data in the heap in order that access to it can be controlled.

One approach to address this issue is to manually identify and remove all sensitive data from the heap before sharing it with a servicing entity. Such an approach is very time consuming, especially for large and complex heap dumps, and prone to error or omission. Also, as part of problem determination many heap dumps are often generated and shared to exercise software or the runtime environment to reproduce and understand a problem. The work involved in identifying and removing sensitive data in such a scenario is prohibitively expensive.

Another approach is to employ a tool to automatically filter data likely to be sensitive from a heap dump based on rules or patterns characterizing known sensitive data. For example a heap dump could be searched for all numbers that may constitute credit card numbers, or to replace all strings with random characters in order to obfuscate or remove possible sensitive references. This approach is not reliable or effective. It is not possible to characterize sensitive data in a way that all such sensitive data is easily identified and all non-sensitive data is retained. Either sensitive data slips through the net and is retained in the dump or non-sensitive data is removed or obfuscated in an over-cautious manner in a way that hinders problem determination.

A further approach is to have sensitive classes of data or data structures identified such that objects that are instances of such classes or data structures can be explicitly removed from or obfuscated in a heap dump. While this approach is effective for those explicitly identified classes and data structures, it cannot fully address the problem due to the nature of data objects in the heap that are encapsulated within or referenced by other data objects. For example, a data object corresponding to a customer and being an instance of a customer class may be identified as a sensitive data object because the customer class is identified as a sensitive class. Such a class can include encapsulated or referenced further objects such as string objects with name and address information, numeric objects including credit card details, references to aggregation data structures including lists of customer orders, communications, etc. These encapsulated or referenced further objects are not indicated as sensitive by virtue of the sensitivity of the customer object, not least because they are instances of classes that can include non-sensitive data. Further, such objects can include extensible data structures or collection objects into which any number of all manners of data objects could be stored. Thus, using this approach to identifying sensitive objects requires a comprehensive definition of all classes of object that could contain sensitive data. In practice, this will include many classes that often never include sensitive data or that sometimes include sensitive data and sometimes do not, such as strings, numerics and collections, so resulting in an overcautious approach with many false positive determinations of sensitivity.

Thus despite these various approaches there remains a need to confirm the sensitivity of a data object in a managed object heap.

BRIEF SUMMARY

Numerous aspects of the disclosure are contemplated which can be optionally implemented in various embodiments of the disclosure. Not all aspects are present in every embodiment, and described aspects are expected to be tailored and adapted for specific implementations. Thus, the various aspects and details expressed herein, when taken as a whole, permit one of ordinary skill in the art to grasp the scope of the present disclosure, which is defined more succinctly by the claims. It should be understood that nothing in this brief summary or detailed description is meant to be construed in a manner that limits the scope of the claimed content expressed herein.

One aspect of the disclosure is a method for confirming the sensitivity of a data object in a managed object heap software runtime environment based on a determination that the object is accessible only via other objects known to be sensitive. Thus objects not predetermined as sensitive can be confirmed as sensitive by virtue of their accessibility only via known sensitive objects.

The disclosure provides, in a second aspect, an apparatus for confirming the sensitivity of a data object in a managed object heap software runtime environment by means for determining that the object is accessible only via other objects known to be sensitive.

The disclosure provides, in a third aspect, an apparatus comprising: a central processing unit; a memory subsystem; an input/output subsystem; and a bus subsystem interconnecting the central processing unit, the memory subsystem, the input/output subsystem; and the apparatus as described above.

The disclosure provides, in a fourth aspect, a computer program element comprising computer program code, when loaded into a computer system and executed thereon, to cause the computer to perform the steps of a method as described above.

BRIEF DESCRIPTION OF THE SEVERAL VIEWS OF THE DRAWINGS

FIG. 1 is a block diagram of a computer system suitable for the operation of embodiments of the disclosure;

DETAILED DESCRIPTION

Figure 2A:
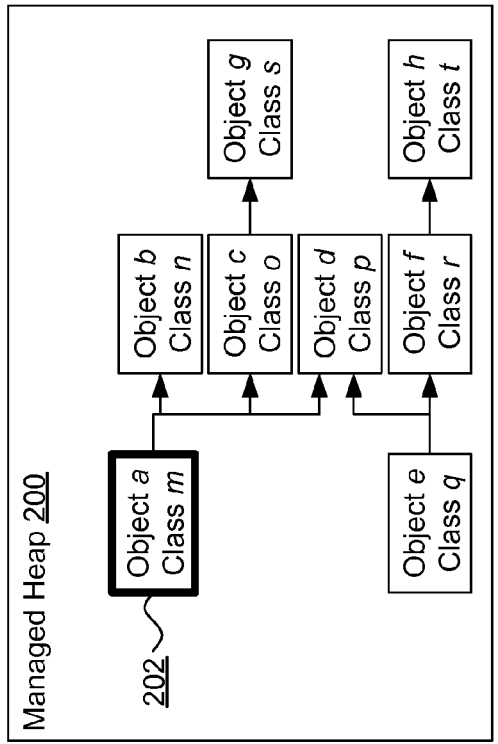
FIG. 2a is a block diagram representation of data stored in a managed heap in a software runtime environment in accordance with an embodiment of the disclosure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate transmission medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, FIG. 1 is a block diagram of a computer system suitable for the operation of embodiments of the disclosure. A central processor unit (CPU) 102 is communicatively connected to a storage 104 (e.g., computer readable storage medium) and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

FIG. 2a is a block diagram representation of data stored in a managed heap 200 in a software runtime environment in accordance with an embodiment of the disclosure. Software runtime environments such as a Java Virtual Machine, a runtime environment for C# such as the Common Language Runtime or runtime environments for scripting languages can include a managed heap 200 as a memory storage area for the allocation and storage of application data. Application data includes objects, data structures and primitive data elements that are created, stored and referenced by software applications running within the runtime environment. The heap is managed such as by inclusion of a garbage collector or similar technology.

The illustrative managed heap 200 of FIG. 2a includes stored objects a to h each being an instance of classes m to t respectively. The data stored in managed heap 200 is object data for an object oriented application running in a runtime environment supporting the object oriented programming paradigm. It will be apparent to those skilled in the art that the data stored in the managed heap 200 could alternatively be organized using a traditional data-oriented paradigm using data structures organized according to data structure definitions as distinct from objects as instances of classes.

The objects in heap 200 can be referenced by the application using object references. Further, the objects can reference, embed or encapsulate each other by the inclusion of references or encapsulations within objects in the heap 200. Thus, object g is accessible via object c since object c includes a reference to object g or object c encapsulates object g. Similarly, object c is accessible via object a. In this way a path to accessing object g is available from either object a or object c. Other similar access paths are available for other objects such that, for example, object d is accessible via either of objects a or e, and object h is accessible via either of objects for e.

The application in execution will include some references to objects in the heap 200. Normally, at least root objects will be referenced by the application, root objects being objects not otherwise accessible via other objects. In the heap 200 of FIG. 2a, objects a and e are root objects.

Some classes of object are identified ahead of execution time as being sensitive. Class m is identified as sensitive and objects that are instances of class m are therefore indicated as sensitive within the heap 200. Thus, object a is indicated as sensitive in the managed heap 200 by the bold box 202. On practical implementation such an indication can be realized by including additional class level flags or indicators for a class, maintaining a data structure detailing classes being sensitive or using numerous other techniques that will be readily apparent to those skilled in the art.

According to embodiments of the disclosure, objects in a managed heap can be confirmed to be sensitive if they are accessible only via other objects known to be sensitive. Thus, objects accessible only via object a in heap 200 derive sensitivity from this fact. Accordingly, objects b, c and g are also sensitive objects although this information is not required to be recorded for these objects within the heap itself or in association with the objects or classes themselves. The sensitivity of these objects can be confirmed by deriving the sensitivity from the accessibility of the objects only via a predetermined sensitive object, object a. In contrast, object d is not considered to be sensitive. While object d is accessible via object a, which is a sensitive object, object d is also accessible via object e, which is not a sensitive object. Thus, object d is not a sensitive object since it is not accessible only via other objects known to be sensitive.

Figure 2B:
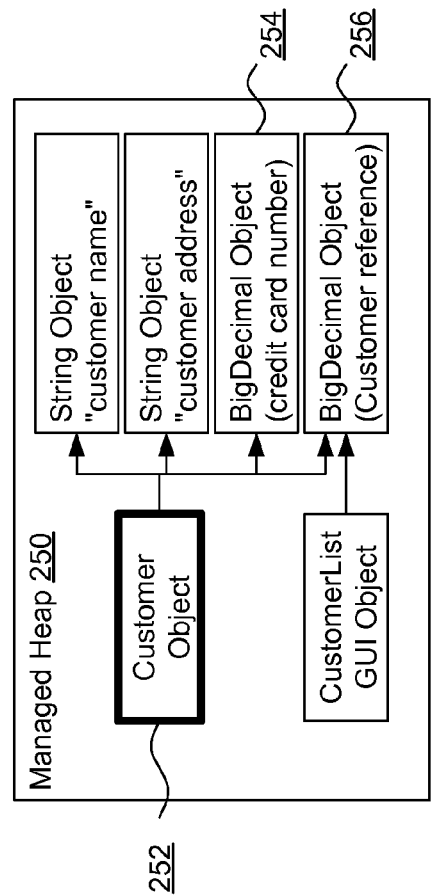
FIG. 2b is a further block diagram representation of data stored in a managed heap in a software runtime environment in accordance with an embodiment of the disclosure.

FIG. 2b is a further block diagram representation of data stored in a managed heap 250 in a software runtime environment in accordance with an embodiment of the disclosure. The arrangement of FIG. 2b is largely the same as that described above with respect to FIG. 2a with a different arrangement of data stored in the heap 250 of FIG. 2b. Heap 250 includes two root objects, one an instance of a "Customer" class and the other an instance of a "CustomerList". The "Customer" object includes references to four further objects: an instance of a "String" class storing a customer name; an instance of the "String" class storing a customer address; an instance of a "BigDecimal" class storing a credit card number; and an instance of the "BigDecimal" class storing a customer reference. The "CustomerList" object includes a reference to the "BigDecimal" object storing a customer reference.

The "Customer" class is predetermined to be a sensitive class such that instances of the "Customer" class are sensitive objects. This determination can be made at any point in the design or development of an application or could be specified as part of the application specification. The instance of the "Customer" object 252 is therefore indicated to be a sensitive object by a bold box. None of the other objects in the heap 250 are predetermined to be sensitive.

In use it can be necessary to examine the content of the heap 250 in order to, for example, undertake problem determination activities for an application executing in a runtime environment using the heap 250. For example, memory leaks, unpredictable results, exceptions, errors or other software problems can be diagnosed and resolved with reference to the state of the runtime environment and executing application indicated by the data stored in the heap. The heap can be examined dynamically at runtime using diagnosis tools, as part of a debugging operation using a software debugger, or by making a record of the contents of the heap in a file such as a dump file (known as a heap dump).

The protection of sensitive data stored in the heap extends beyond the data stored in instances of classes explicitly determined to be sensitive. For example, the customer name, address and credit card number stored in the heap 250 are sensitive but are not instances of the "Customer" class which is predetermined to be sensitive. Accordingly, it is necessary for a data object in the heap 250 to confirm whether the object is sensitive or not. Such an activity can take place as part of the functionality of a problem diagnosis tool, or as a separate activity to process a heap dump. An object in the heap 250 can be confirmed to be sensitive using methods in accordance with embodiments of the disclosure as described below with reference to FIG. 3.

Figure 3:
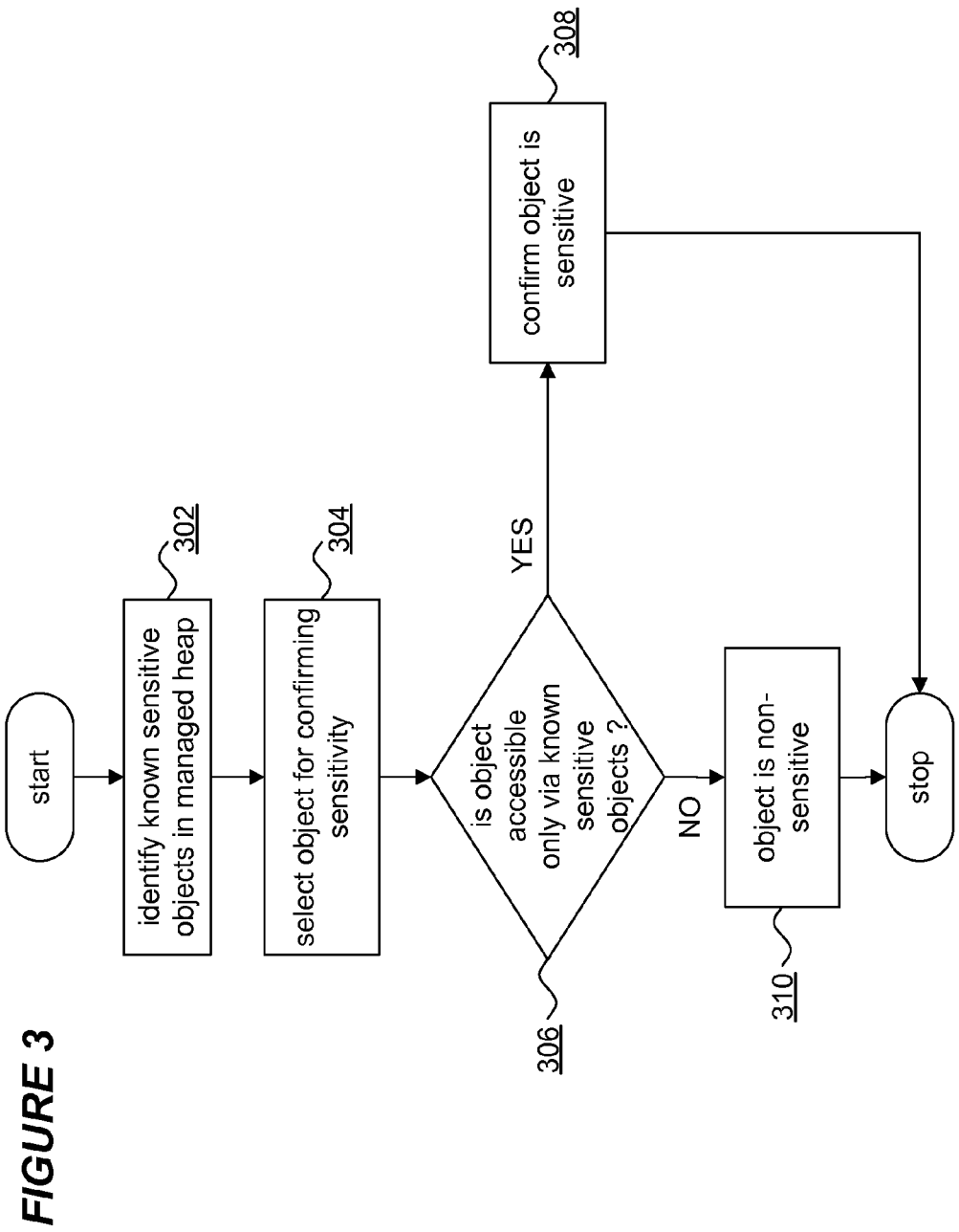
FIG. 3 is a flowchart of a method for confirming the sensitivity of a data object in a managed heap in accordance with an embodiment of the disclosure.

FIG. 3 is a flowchart of a method for confirming the sensitivity of a data object in a managed heap in accordance with an embodiment of the disclosure. Initially, at step 302, the method identifies known sensitive objects in the managed heap. The known sensitive objects can be identified as instances of known sensitive classes that are predetermined as described above. The identification of step 302 could alternatively take place at a later stage in the method of FIG. 3, such as after step 304. It will be apparent to those skilled in the art that the identification could alternatively be undertaken for data structures in a traditional data-oriented application where sensitive data structures are defined, and instances of such data structures are identified at step 302.

At step 304, a current object for which a confirmation of sensitivity is required is selected. For example, the instance of the class "BigDecimal" storing a credit card number 254 in FIG. 2b is selected. At step 306, the method determines if the selected object is only accessible via known sensitive objects. This determination is made by analyzing all paths of access to the selected object using techniques such as those that will be described later. With reference to FIG. 2b it is clear that the object 254 is referenced only by the "Customer" object 252 which is a known sensitive object. Thus, the determination at step 306 is that the object 254 is accessible only via known sensitive objects and the method confirms the sensitivity of object 254 at step 308.

In contrast, if the "BigDecimal" object storing a customer reference 256 is selected at step 304, the method would make a negative determination at step 306 because object 256 is accessible via both the sensitive "Customer" object 252 and via the non-sensitive "CustomerList" object. Accordingly, the determination at step 306 is that the object 256 is not only accessible via known sensitive objects and the method would conclude that the object 256 is non-sensitive at step 310.

Thus, in this way, while the two objects 254 and 256 are both instances of the class "BigDecimal", only object 254 is confirmed to be sensitive while object 256 is not. Embodiments of the disclosure therefore provide for a dynamic determination of the sensitivity (or otherwise) of an object without a need to specify in advance the sensitivity of each and every class in an application, allowing objects of the same class to have their sensitivity determined differently.

The determination at step 306 is made by analyzing all paths of access to a selected object. In a managed heap having few data objects or a straightforward relationship between data objects this can be a trivial determination. However, often the quantity and complexity of data stored by an application in a heap can be high and analyzing all paths of access to a selected object can be difficult. Those skilled in the art will be aware that graph traversal algorithms including efficient recursive algorithms will be suitable for addressing this problem.

In one embodiment, the method further includes the generation of a second representation of the data stored in the heap as a 'dominator tree'. A dominator tree is a graph in which a first node is said to dominate a second node if paths from a start node to the second node must go through the first node. Dominator trees are often used for control flow graphs (graphs of all paths that can be traversed through a software program during execution) in order to produce efficient optimizing software compilers. In the context of embodiments of the disclosure, a dominator tree representation can be generated of objects in a managed heap to represent paths through which objects in the heap can be accessed via other objects. The generation of such dominator trees for objects in a managed heap is known, such as in the Eclipse Memory Analyzer Tool available at www.eclipse-.org/mat. A generated dominator tree for a heap represents dominance between objects in a heap in terms of accessibility of objects such that a selected object that is only accessible via a root object is indicated as being dominated by the root object. Once generated, the dominator tree provides a more efficient starting point from which to determine all paths to a selected object in the memory heap since it avoids the complexity of the actual arrangement of data objects in the heap, focusing only on the relative dominance of the objects.

Figure 4:
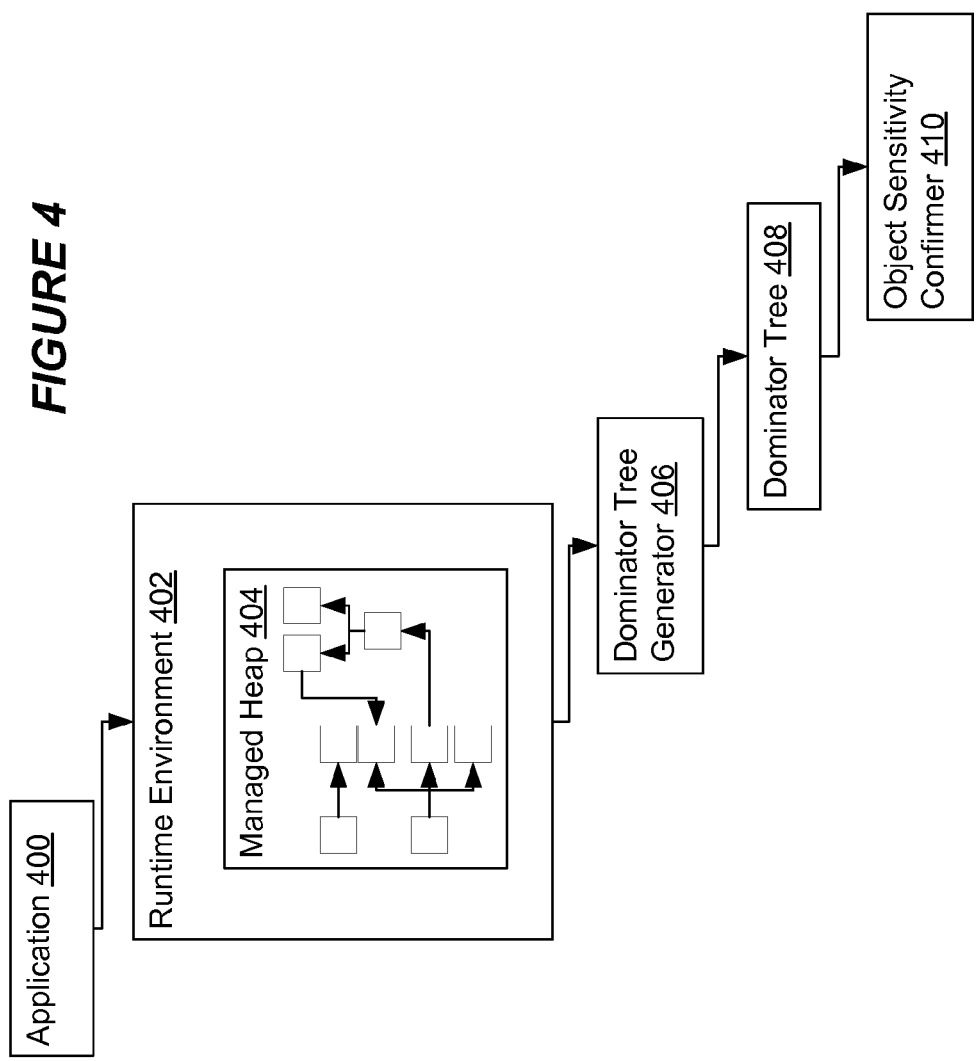
FIG. 4 is a block diagram illustrating an arrangement of components for confirming the sensitivity of an object in a managed heap in use in accordance with an embodiment of the disclosure.

FIG. 4 is a block diagram illustrating an arrangement of components for confirming the sensitivity of an object in a managed heap in use in accordance with an embodiment of the disclosure. An application 400 executing with a runtime environment 402 stores data objects in a managed heap 404. A dominator tree generator 406 such as that provided by the Eclipse Memory Analyzer Tool generates a dominator tree representation of the heap 408 for use by an object sensitivity confirmer 410 using the method of FIG. 3 to confirm the sensitivity of a selected object in the heap 404.

In use, objects that are confirmed to be sensitive can be treated differently within the heap or within a heap dump during exposure to problem determination or diagnosis activities such that sensitive data is not exposed. For example, a data object confirmed to be sensitive can be removed from a dump of the heap. Alternatively, where a heap dump is not used, a runtime environment can make a sensitive object inaccessible to an application executing in the runtime environment, such as by obfuscating, hiding or securing the data object. In one embodiment a heap analysis tool for use in exploring the contents of a managed heap is operable to hide details of confirmed sensitive objects from users of the tool such that sensitive data is not exposed to the users.

For avoidance of doubt, the term "comprising" as used herein throughout the description and claims is not to be construed as meaning "consisting only of". It will also be appreciated by those skilled in the art that the invention is not simply limited to email messages, but is also applicable to other types of messages that have a distribution list that can be updated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for handling a heap of data objects in a non-transitory computer readable storage medium comprising:
    selecting a data object in a managed object heap of a software runtime environment of a computer system, wherein the managed object heap includes one or more data objects predetermined to be sensitive, and the selected object is other than a data object predetermined to be sensitive;
    analyzing paths of access to the selected object via one or more other data objects in the managed object heap through which the selected object is accessible;
    determining as a result of the analysis whether the selected object is only accessible via known sensitive objects;
    categorizing the selected object as non-sensitive in response to determining that the selected object is accessible via a known non-sensitive objects; and
    categorizing the selected data object as sensitive in response to determining that the selected object is only accessible via known sensitive objects.

2. The method of claim 1 further comprising:
    generating a dominator tree representation of objects in the managed object heap, the dominator tree indicating references between objects in the managed object heap, wherein the paths are analyzed using the dominator tree.

3. The method of claim 1, further comprising:
    responsive to categorizing the selected data object as sensitive, removing the selected data object from a dump of the managed object heap.

4. The method of claim 1, further comprising:
    categorizing each of a plurality of data objects of the managed object heap as being a sensitive object or being a non-sensitive object in accordance with the analysis; and
    utilizing a heap analysis tool to hide details of each sensitive object from users of the heap analysis tool while not hiding details of each non-sensitive object from users of the heap analysis tool.

5. The method of claim 1, further comprising:
    making a sensitive object inaccessible to an application executing in the software runtime environment, wherein objects of the managed object heap that are not sensitive are accessible to the application.

6. A computer program product comprising a non-transitory computer readable storage medium having computer usable code embodied therewith, the computer usable program code comprising:
    computer usable program code stored on said storage medium that when executed by a processor is operable to:
    select a data object in a managed object heap of a software runtime environment of a computer system, wherein the managed object heap includes one or more data objects predetermined to be sensitive, and the selected object is other than a data object predetermined to be sensitive;
    analyze paths of access to the selected object via one or more other data objects in the managed object heap through which the selected object is accessible;
    determine as a result of the analysis whether the selected object is only accessible via known sensitive objects;
    categorize the selected object as non-sensitive in response to determining that the selected object is accessible via a known non-sensitive objects; and
    categorize the selected data object as sensitive in response to determining that the selected object is only accessible via known sensitive objects.

7. The computer program product of claim 6, further comprising,
    computer usable program code stored on said storage medium that when executed by a processor is operable to generate a dominator tree representation of objects in the managed object heap, the dominator tree indicating references between objects in the managed object heap, wherein the paths are analyzed using the dominator tree.

8. The computer program product of claim 6, further comprising:
    computer usable program code stored on said storage medium that when executed by a processor is operable to, responsive to categorizing the selected data object as sensitive, remove the selected data object from a dump of the managed object heap.

9. The computer program product of claim 6, further comprising:
    computer usable program code stored on said storage medium that when executed by a processor is operable to categorize each of a plurality of data objects of the managed object heap as being a sensitive object or being a non-sensitive object in accordance with the analysis; and
    computer usable program code stored on said storage medium that when executed by a processor is operable to utilize a heap analysis tool to hide details of each sensitive object from users of the heap analysis tool while not hiding details of each non-sensitive object from users of the heap analysis tool.

10. The computer program product of claim 6, further comprising:
    computer usable program code stored on said storage medium that when executed by a processor is operable to make a sensitive object inaccessible to an application executing in the software runtime environment in which the managed object heap operates, wherein objects of the managed object heap that are not sensitive are accessible to the application executing in the software runtime environment.

11. An apparatus comprising:
a central processing unit;
a memory subsystem;
an input/output subsystem; and
a bus subsystem interconnecting the central processing unit, the memory subsystem, the input/output subsystem, wherein said apparatus is operable to:
select a data object in a managed object heap of a software runtime environment of a computer system, wherein the managed object heap includes one or more data objects predetermined to be sensitive, and the selected object is other than a data object predetermined to be sensitive;
analyze paths of access to the selected object via one or more other data objects in the managed object heap through which the selected object is accessible;
determine as a result of the analysis whether the selected object is only accessible via known sensitive objects;
categorize the selected object as non-sensitive in response to determining that the selected object is accessible via a known non-sensitive object; and
categorize the selected data object as sensitive in response to determining that the selected object is only accessible via known sensitive objects.

12. The apparatus of claim 11, wherein the apparatus is further operable to:
generate a dominator tree representation of objects in the managed object heap, the dominator tree indicating references between objects in the managed object heap, wherein the paths are analyzed using the dominator tree.

13. The apparatus of claim 11, wherein the apparatus is further operable to:
remove the selected data object from a dump of the managed object heap responsive to categorizing the selected data object as sensitive.

14. The apparatus of claim 11, wherein the apparatus is further operable to:
categorize each of a plurality of data objects of the managed object heap as being a sensitive object or being a non-sensitive object in accordance with the analysis; and
utilize a heap analysis tool to hide details of each sensitive object from users of the heap analysis tool while not hiding details of each non-sensitive object from users of the heap analysis tool.

15. The apparatus of claim 11, wherein the apparatus is further operable to:
make a sensitive object inaccessible to an application executing in the software runtime environment, wherein objects of the managed object heap that are not sensitive are accessible to the application.

16. A system comprising:
a processor including:
a software runtime environment resulting from the processor executing computer program instructions stored in a computer readable storage medium;
a managed object heap of the software runtime environment comprising a plurality of data objects including one or more data objects predetermined to be sensitive and selected data objects not predetermined to be sensitive, wherein the managed object heap utilizes storage space of a nontangible computer readable storage medium to store the data objects; and
a program of the software runtime environment operable to determine whether each of the selected data objects of the managed object heap are to be considered sensitive objects or non-sensitive objects, wherein the program
analyzes paths of access to the selected data objects via one or more other data objects in the managed object heap through which the data objects are accessible;
determines as a result of the analysis whether the selected object is only accessible via known sensitive object(s);
categorizes the selected object as non-sensitive in response to determining that the selected object is accessible via a known non-sensitive object; and
determines that the selected data objects are to be considered sensitive objects in response to determining that the selected object is only accessible via known sensitive object(s).

17. The system of claim 16, wherein said program of the software runtime environment is operable to generate a dominator tree representation of data objects in the managed object heap, the dominator tree indicating references between data objects in the managed object heap, wherein the paths are analyzed using the dominator tree.

18. The system of claim 16, wherein a program of the software runtime environment is operable to remove each of the sensitive objects from a dump of the managed object heap and leaves each of the non-sensitive objects in the dump.

19. The system of claim 16, further comprising:
a heap analysis tool operable to execute in the software runtime environment to hide details of each of the sensitive objects from users of the heap analysis tool while not hiding details of each of the non-sensitive objects from the users of the heap analysis tool.

20. The system of claim 16, wherein a program of the software runtime environment is operable to make each of the sensitive objects inaccessible to an application executing in the software runtime environment, wherein non-sensitive objects of the managed object heap are accessible to the application.

* * * * *